(12) United States Patent
Stevens et al.

(10) Patent No.: US 8,228,888 B1
(45) Date of Patent: Jul. 24, 2012

(54) CODE-AGILE TIME DIVISION MULTIPLEXING

(75) Inventors: Rick C. Stevens, Apple Valley, MN (US); Howard J. Schantz, Inver Grove Heights, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 585 days.

(21) Appl. No.: 12/500,944

(22) Filed: Jul. 10, 2009

(51) Int. Cl.
*H04B 7/216* (2006.01)
(52) U.S. Cl. .......................................... 370/342; 398/78
(58) Field of Classification Search .................. 370/342, 370/441; 398/78
See application file for complete search history.

(56) References Cited

U.S. PATENT DOCUMENTS 7,505,597 B2 *   3/2009   Stevens et al. ................ 380/270
7,983,562 B1 *   7/2011   Yap et al. ......................... 398/78
* cited by examiner

*Primary Examiner* — Ricky Ngo
*Assistant Examiner* — Phuongchau B Nguyen
(74) *Attorney, Agent, or Firm* — Hamre, Schumann, Mueller & Larson, P.C.

(57) ABSTRACT

Methods and systems for optimizing the efficiency of simultaneous data transfers throughout a data network are provided. In the system, a time division system clock includes a network time division clock policy having a plurality of time slots. The network time division clock policy identifies a unique clock code for each of the time slots. Also, a source node and a destination node each include a portion of the network time division clock policy. The time division system clock continuously transmits the unique clock code identified for a particular time slot to the source node and the destination node during the duration of the time slot. Based on the clock code, the source nodes determines if it is assigned a communication channel to transmit collision-free data to the destination node during the duration of the particular time slot.

18 Claims, 7 Drawing Sheets

Time Slot #1

Time Slot #2

Time Slot #4

CODE-AGILE TIME DIVISION MULTIPLEXING

FIELD

The disclosure relates to methods and systems for optimizing the efficiency of simultaneous data transfers throughout a data network.

BACKGROUND

In communications networks, many methods and systems exist for optimizing the efficiency of data transfers throughout a data network. These approaches include using optical code division multiple access ("OCDMA") data networks, switched interconnects, collision based interconnects, separate interconnects and common higher bandwidth protocol interconnects. However, each of these approaches has significant drawbacks. For example, with respect to native optical code division multiple access ("OCDMA") data networks, a problem is found whereby when two or more encoders send data via a communication channel to the same decoder an undetectable data collision occurs. Thus, native OCDMA techniques do not support organized channel sharing by two or more encoders. Also, a switched interconnect approach requires a centralized switch for channel arbitration and bandwidth allocation. With a collision based interconnect approach, an undesirable latency period in determining bandwidth allocation based on detected data collisions is created. A separate interconnect approach requires separate physical interfaces to provide sufficient channel-to-channel isolation. A common higher bandwidth protocol interconnect approach does not allow for variable bandwidth allocation and requires all nodes in the data network to be converted to a single high bandwidth protocol.

SUMMARY

This application describes code agile time division multiplexing methods and systems for optimizing the efficiency of simultaneous data transfers throughout a data network. The methods and systems described herein allow a communication channel to be shared between multiple senders simultaneously while avoiding any data collisions. The methods and systems herein also enable high performance data communication, programmable and modifiable bandwidth allocation and quality of service with low-latency and no-arbitration, and security isolation on a physically constructed linear topology.

In one embodiment, the data network is an OCDMA network that uses code agile time division multiplexing methods and systems to support organized channel sharing by two or more source multiplexers. Accordingly, the methods and systems described herein provide multiplexing parallelism such that two or more communication bit streams can be performed simultaneously.

In one embodiment, a system for optimizing the efficiency of simultaneous data transfers throughout a data network is provided. The system includes a time division system clock, a source node and a destination node. The time division system clock includes a network time division clock policy having a plurality of time slots, wherein the network time division clock policy identifies a unique clock code for each of the plurality of time slots. The source node includes a unique source node portion of the network time division clock policy, and the destination node includes a destination node portion of the network time division clock policy. The time division system clock is configured to continuously transmit the unique clock code identified for a particular time slot to the source node and the destination node during the duration of the particular time slot. Also, based on the clock code, the source node determines whether it is assigned a communication channel to transmit collision-free data to the destination node during the duration of the particular time slot.

In another embodiment, a method for optimizing the efficiency of simultaneous data transfers throughout a data network is provided. The method includes a network time division clock policy within a time division system clock identifying a unique clock code for a particular time slot of a plurality of time slots. The method also includes the time division system clock continuously transmitting the unique clock code associated with the particular time slot during a time duration of the particular time slot. The method further includes, a source node receiving the unique clock code and determining whether the source node is assigned to a destination node based on the received unique clock code and a unique source node portion of the network time division clock policy included in the source node, and if the source node is assigned to the destination node is capable of transmitting a collision-free data transmission to the destination node. Also, the method includes the destination node receiving the unique clock code from the time division system clock and if the source node is assigned to the destination node, the destination node is capable of receiving a collision-free data transmission from the source node and identifying the source node sending the collision-free data transmission based on the unique clock code and a destination node portion of the network time division clock policy included in the destination node.

DRAWINGS

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice what is claimed, and it is to be understood that other embodiments may be utilized and that logical, mechanical and electrical changes may be made without departing from the spirit and scope of the claims. The following detailed description is, therefore, not to be taken in a limiting sense.

Embodiments presented herein involve methods and systems for optimizing the efficiency of simultaneous data transfers throughout a network. The embodiments described herein, specifically relate to an optical data network for transferring digital data. In particular, the embodiments described herein allow one or more source nodes (i.e. source multiplexers) and one or more destination nodes (destination demultiplexers) to simultaneously transmit and receive data over one or more OCDMA communication channels in an OCDMA optical data network using a code agile time division multiplexing methodology and system to avoid data collisions. However, in other embodiments, the methods and systems employed herein can be used in a wavelength-division multiplexing ("WDM") based network. Also, in some embodiments, the methods and systems employed herein can be used in data networks for transferring analog data such as a radio frequency ("RF") based network.

Figure 1:
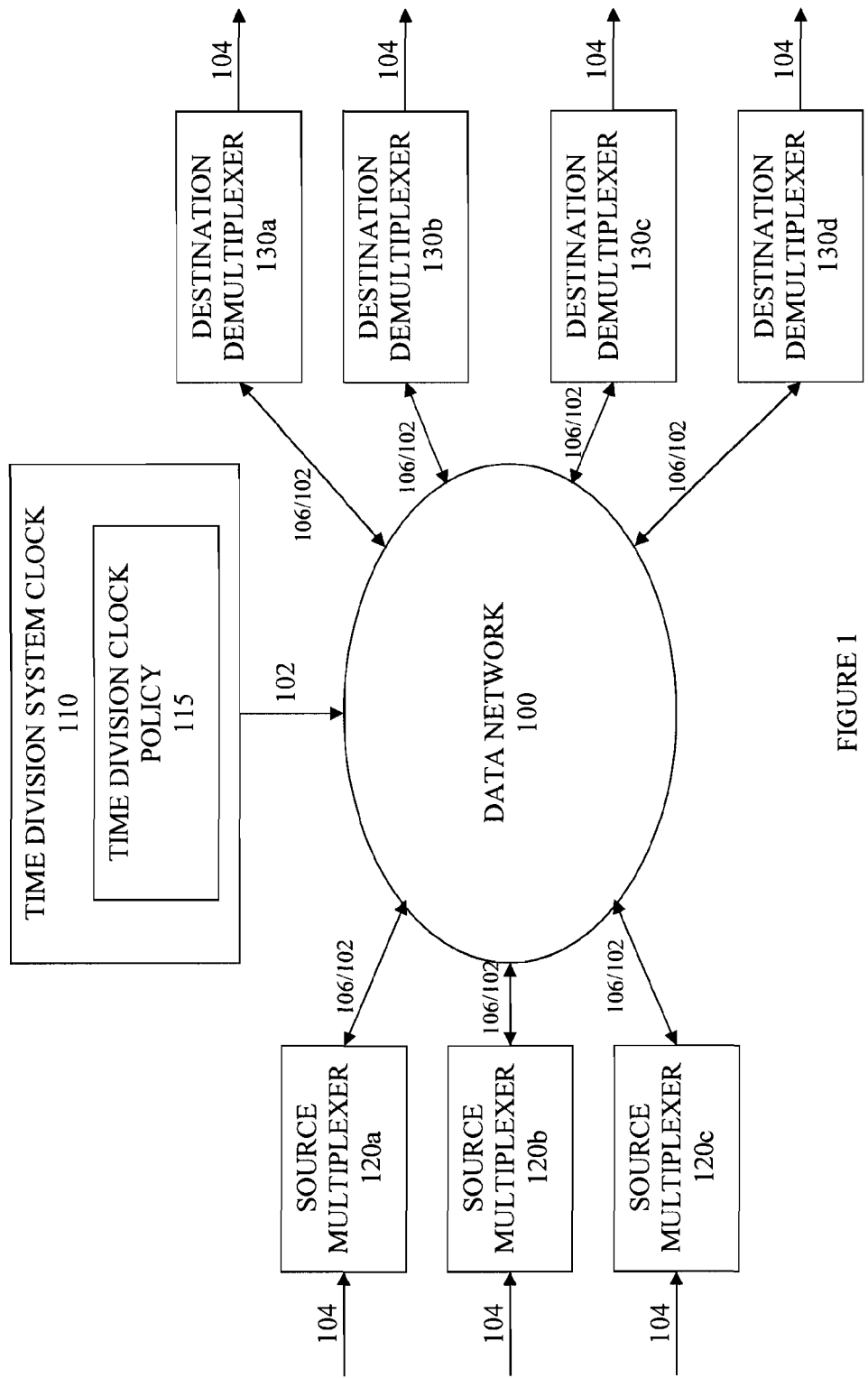
FIG. 1 is a block diagram of an optical data network according to one embodiment.

Referring to FIG. 1, an optical data network 100 for transferring collision-free data between three OCDMA code agile time division multiplexing source multiplexers 120a-c and four OCDMA code agile time division multiplexing destination demultiplexers 130a-d via an OCDMA communication channel 106 is provided. Each source multiplexer 120a-c and each destination demultiplexer 130a-d is synchronized to a time division system clock 110. The time division system clock 110 is responsible for generating timeslots used by the source multiplexers 120a-c and the destination demultiplexers 130a-d to transmit and receive collision-free data.

While the embodiment in FIGS. 1 and 2A-2D include three source multiplexers 120 and four destination demultiplexers 130, in other embodiments, the number of source multiplexers and destination demultiplexers can vary depending on the application. For example, in some embodiments, the data network 100 may include only a single source multiplexer or only a single destination multiplexer. Also, while only a single communication channel 106 is provided for transferring data between the source multiplexers 120a-c and the destination demultiplexers 130a-d, in other embodiments communication between the source multiplexers 120a-c and the destination demultiplexers 130a-d can be separated between multiple communication channels.

The time division system clock 110 includes a time division clock policy 115 (an example of one time division clock policy illustrated in Tables 1 and 2) used to identify which of a plurality of clock codes during a given time slot are to be continuously transmitted to each of the plurality of source multiplexers 120a-c and each of the plurality of destination demultiplexers 130a-d via a separate OCDMA communication channel 102. In some embodiments the communication channel 102 can be a low bandwidth or low speed communication channel in comparison to the communication channel 106, as the communication channel 102 is only required to continuously transmit clock codes from the time division system clock 110 to each of the plurality of source multiplexers 120a-c and each of the plurality of destination demultiplexers 130a-d.

As illustrated in Tables 1 and 2 below, the time division system clock 110 during any given time slot is capable of continuously and simultaneously transmitting a plurality of clock codes via the communication channel 102. This allows the network 100 to support multiplexing parallelism in which multiple source multiplexers 120a-c are capable of transmitting data to multiple demultiplexers 120a-d simultaneously via the communication channel 106 during any given time slot while avoiding any data collisions.

Table 1 illustrates one example of the time division clock policy 115 shown in FIG. 1. The time division clock policy uses four unique time slots that are repeated on a continuous basis. At each of the four unique time slots, three unique clock codes are identified by the time division system clock 110 to be continuously and simultaneously transmitted to each of the source multiplexers 120a-c and each of the destination demultiplexers 130a-d via the communication channel 102. The time division clock policy 115 illustrated in Table 1 includes 12 unique clock codes.

TABLE 1

Time Division Clock Policy

| Time Slot | OCDMA Clock Code (Parallel Codes per Time Slot) | | |
|---|---|---|---|
| #1 | Clock Code 1 | Clock Code 2 | Clock Code 3 |
| #2 | Clock Code 4 | Clock Code 5 | Clock Code 6 |
| #3 | Clock Code 7 | Clock Code 8 | Clock Code 9 |
| #4 | Clock Code 10 | Clock Code 11 | Clock Code 12 |
| | Repeat Above Pattern | | |

The clock codes provided in the time division clock policy 115 are conventional OCDMA codes used solely as a technique to generate a clocking signal, and are not used to transfer data. As illustrated in Table 2, in this embodiment, each of the 12 unique clock codes provided in the time division clock policy 115 are assigned to one of the plurality of source multiplexers 120a-c and one of the plurality of destination demultiplexers 130a-d. Thus, each of the 12 clock codes indicates which source multiplexer 120a-c is assigned to interact with which destination demultiplexer 130a-d. As illustrated in Table 2, in this embodiment, each of the four destination multiplexers 130a-d has the opportunity to interface with each of the three source multiplexers only once during the complete cycle of time slots. This allows the network 100 to achieve collision-free, parallel transmission per time slot using code-agile time division multiplexing.

It should be noted that the number of unique time slots and the number of unique clock codes to be transmitted per unique time slot can vary depending on the needs of the network 100. The number of clock codes sent during a time slot is dependent on various factors including: the number of adequate communication channels 106 available in the data network; the number of source multiplexers in the data network; and the number of destination demultiplexers in the data network. Also, the minimum number of clock codes required for each source multiplexer to communicate with each destination demultiplexer in a data network comprising m source multiplexers and n destination demultiplexers is m*n.

TABLE 2

Example Allocation of Source Multiplexer and Destination Demultiplexer

| Time Slot | OCDMA Clock Code (Source Multiplexer → Destination Demultiplexer) | | |
|---|---|---|---|
| #1 | Clock Code 1 (120a → 130a) | Clock Code 2 (120b → 130b) | Clock Code 3 (120c → 130c) |
| #2 | Clock Code 4 (120a → 130b) | Clock Code 5 (120b → 130c) | Clock Code 6 (120c → 130d) |
| #3 | Clock Code 7 (120a → 130c) | Clock Code 8 (120b → 130d) | Clock Code 9 (120c → 130a) |
| #4 | Clock Code 10 (120a → 130d) | Clock Code 11 (120b → 130a) | Clock Code 1 (120c → 130b) |
| | Repeat Above Pattern | | |

Similarly, each of the source multiplexers 120a-c and each of the destination demultiplexers 130a-d include at least a portion of the time division clock policy 115 relevant to the particular source multiplexer 120a-c or the particular destination demultiplexer 130a-d. For example, in one embodiment, each of the source multiplexers 120a-c includes a time division multiplexer policy (shown in FIG. 3 and an example of one time division multiplexer policy illustrated in Table 3) and each of the destination demultiplexers 130a-d includes a time division demultiplexer policy (shown in FIG. 4 and an example of one time division demultiplexer policy illustrated in Table 4).

Table 3 illustrates one example of a time division multiplex policy for each of the three source multiplexers 120a-c. For example, source multiplexer 120a is capable of decoding up to four clock codes (e.g. clock codes 1, 4, 7 and 10) into one of four assigned destination codes representing each of the four destination demultiplexers 130a-d. In this example, 12 OCDMA clock codes are used to transmit collision-free data in the network 100.

TABLE 3

Time Division Multiplex Policy

| Source Multiplexer | OCDMA Clock Code | OCDMA Destination Code |
|---|---|---|
| 120a | Clock Code #1 | Destination Code #1 |
| | Clock Code #4 | Destination Code #2 |
| | Clock Code #7 | Destination Code #3 |
| | Clock Code #10 | Destination Code #4 |
| 120b | Clock Code #11 | Destination Code #1 |
| | Clock Code #2 | Destination Code #2 |
| | Clock Code #5 | Destination Code #3 |
| | Clock Code #3 | Destination Code #4 |
| 120c | Clock Code #9 | Destination Code #1 |
| | Clock Code #12 | Destination Code #2 |
| | Clock Code #3 | Destination Code #3 |
| | Clock Code #6 | Destination Code #4 |

Table 4 illustrates one example of a time division multiplex policy for each of the four destination demultiplexers 130a-d. For example, destination demultiplexer 130a is capable of decoding up to three clock codes (e.g. clock codes 1, 9 and 11) into one of three assigned multiplexer identifiers representing each of the three source multiplexers 120a-c.

TABLE 4

Time Division Demultiplexer Policy

| Destination Demultiplexer | OCDMA Clock Code | OCDMA Code Agile Time Division Multiplexer Identifier |
|---|---|---|
| 130a | Clock Code #1 | 120a |
| | Clock Code #9 | 120c |
| | Clock Code #11 | 120b |
| 130b | Clock Code #2 | 120b |
| | Clock Code #4 | 120a |
| | Clock Code #12 | 120c |
| 130c | Clock Code #3 | 120c |
| | Clock Code #5 | 120b |
| | Clock Code #7 | 120a |
| 130d | Clock Code #6 | 120c |
| | Clock Code #8 | 120b |
| | Clock Code #10 | 120a |

The time division clock policy 115 illustrated above in Tables 1-4 and shown in FIGS. 2A-2D uses a staggered pattern to allow each source multiplexer 120a-c equal access to communicate data to each destination demultiplexer 130a-d via communication channel 106. While not shown in FIGS. 2A-2D, during each time slot, the time division system clock 110 continuously sends the assigned clock codes based on the time division clock policy 115 to each of the source multiplexers 120a-c and each of the destination demultiplexers 130a-d via communication channel 102.

Figure 2A:
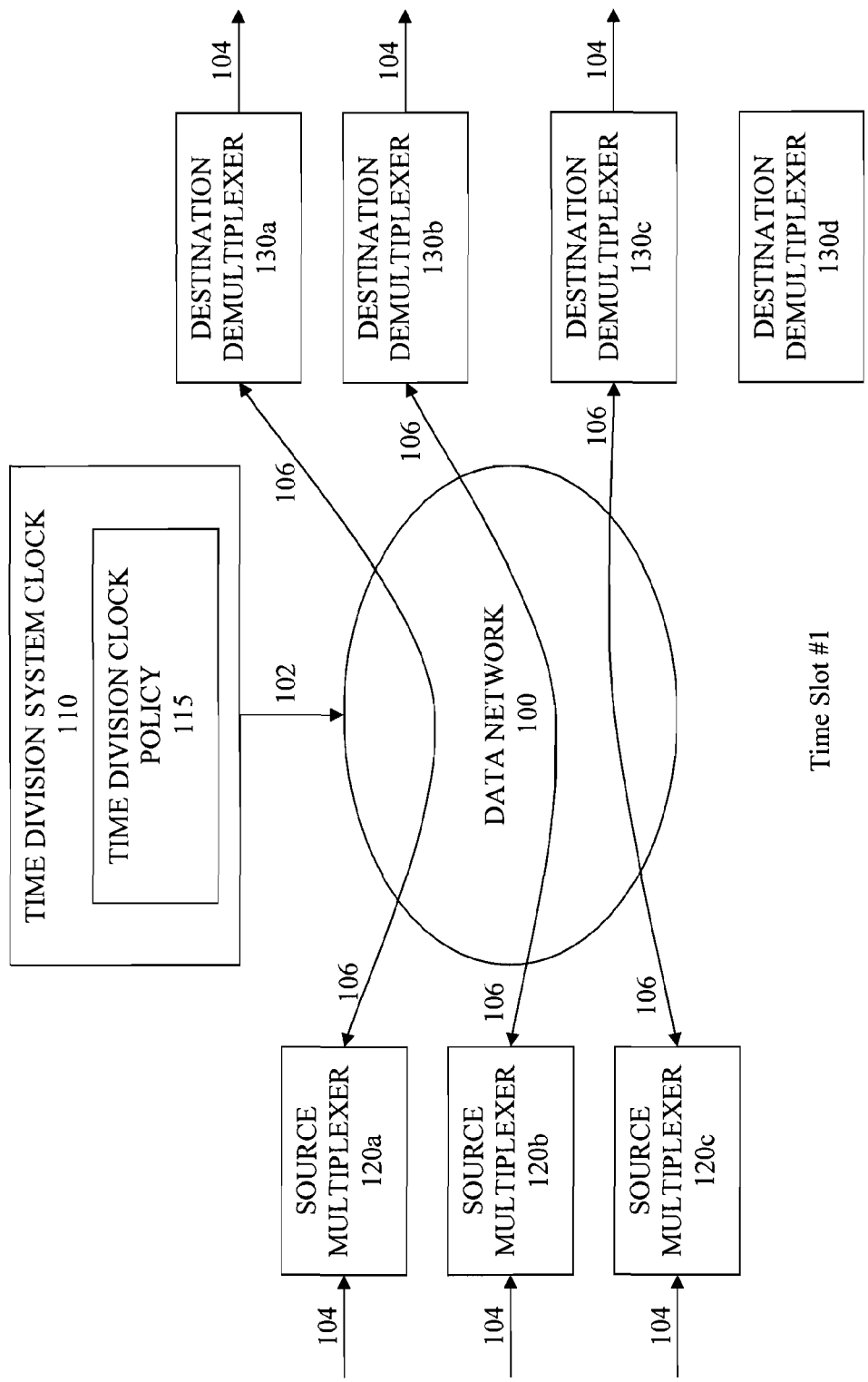
FIGS. 2A-2D are block diagrams of an optical data network during separate time slots of a time division clock policy.

As shown in FIG. 2A, time slot #1 of the time division clock policy 115 provides clock codes that permit the source multiplexer 120a to transmit data to the destination demultiplexer 130a, the source multiplexer 120b to transmit data to the destination demultiplexer 130b, and the source multiplexer 120c to transmit data to the destination demultiplexer 130c. During time slot #1, only clock codes from the time division system clock 110 via communication channel 102 are transmitted to destination demultiplexer 130d.

Figure 2B:
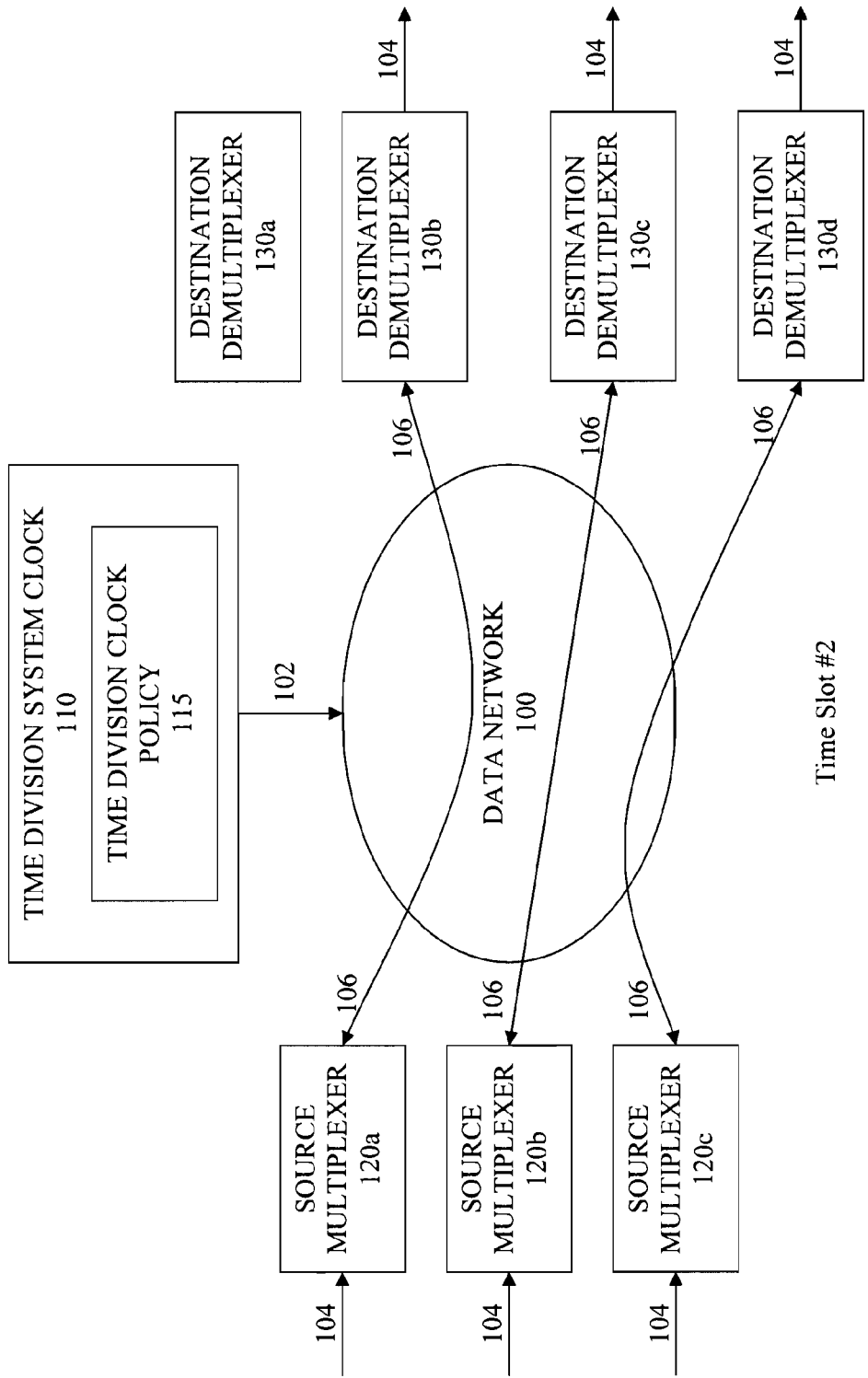

In FIG. 2B, time slot #2 of the time division clock policy 115 provides clock codes that permit the source multiplexer 120a to transmit data to the destination demultiplexer 130b, the source multiplexer 120b to transmit data to the destination demultiplexer 130c, and the source multiplexer 120c to transmit data to the destination demultiplexer 130d. During time slot #2, only clock codes from the time division system clock 110 via communication channel 102 are transmitted to destination demultiplexer 130a.

Figure 2C:
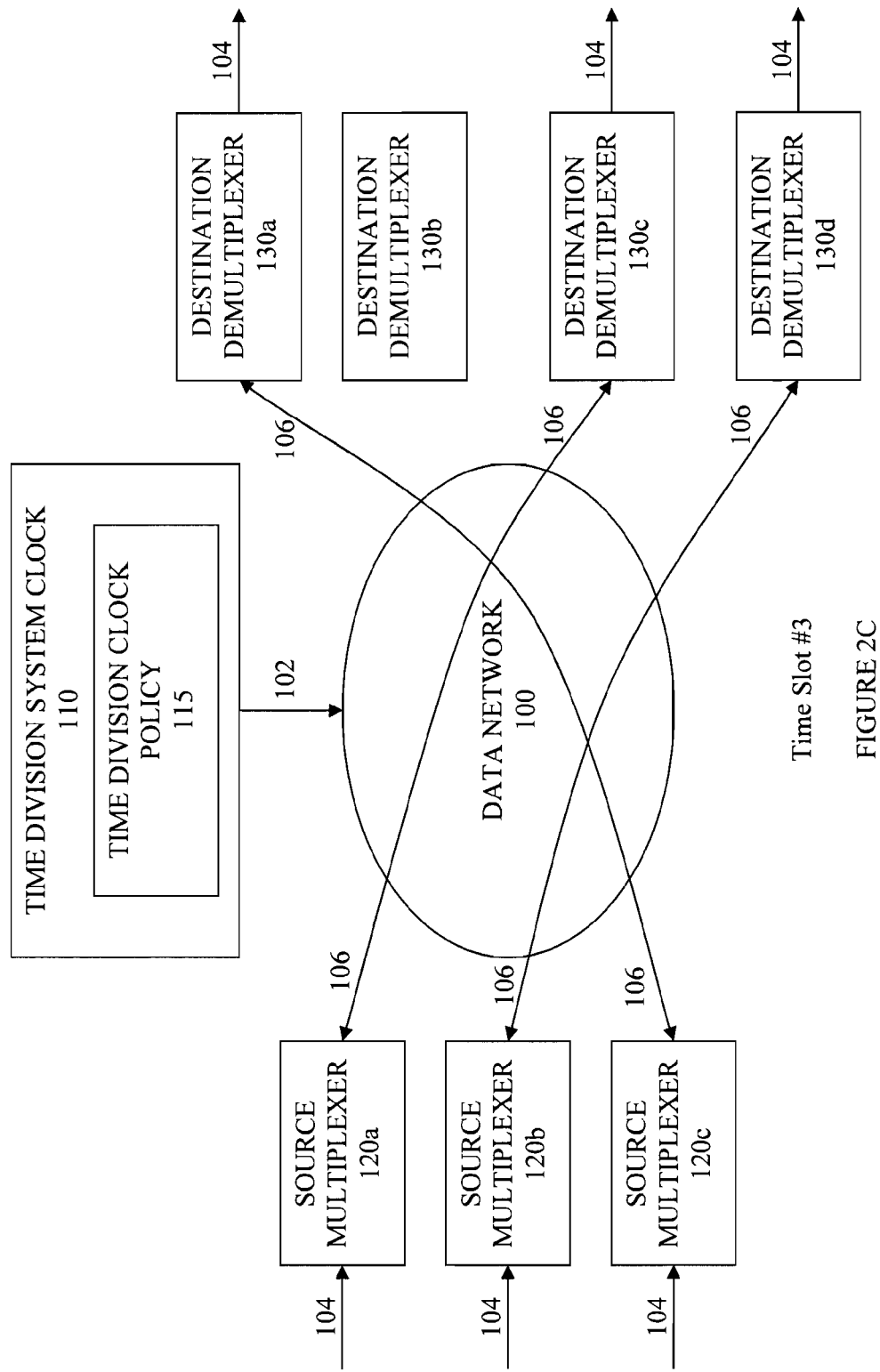

In FIG. 2C, time slot #3 of the time division clock policy 115 provides clock codes that permit the source multiplexer 120a to transmit data to the destination demultiplexer 130c, the source multiplexer 120b to transmit data to the destination demultiplexer 130d, and the source multiplexer 120c to transmit data to the destination demultiplexer 130a. During time slot #3, only clock codes from the time division system clock 110 via communication channel 102 are transmitted to destination demultiplexer 130b.

Figure 2D:
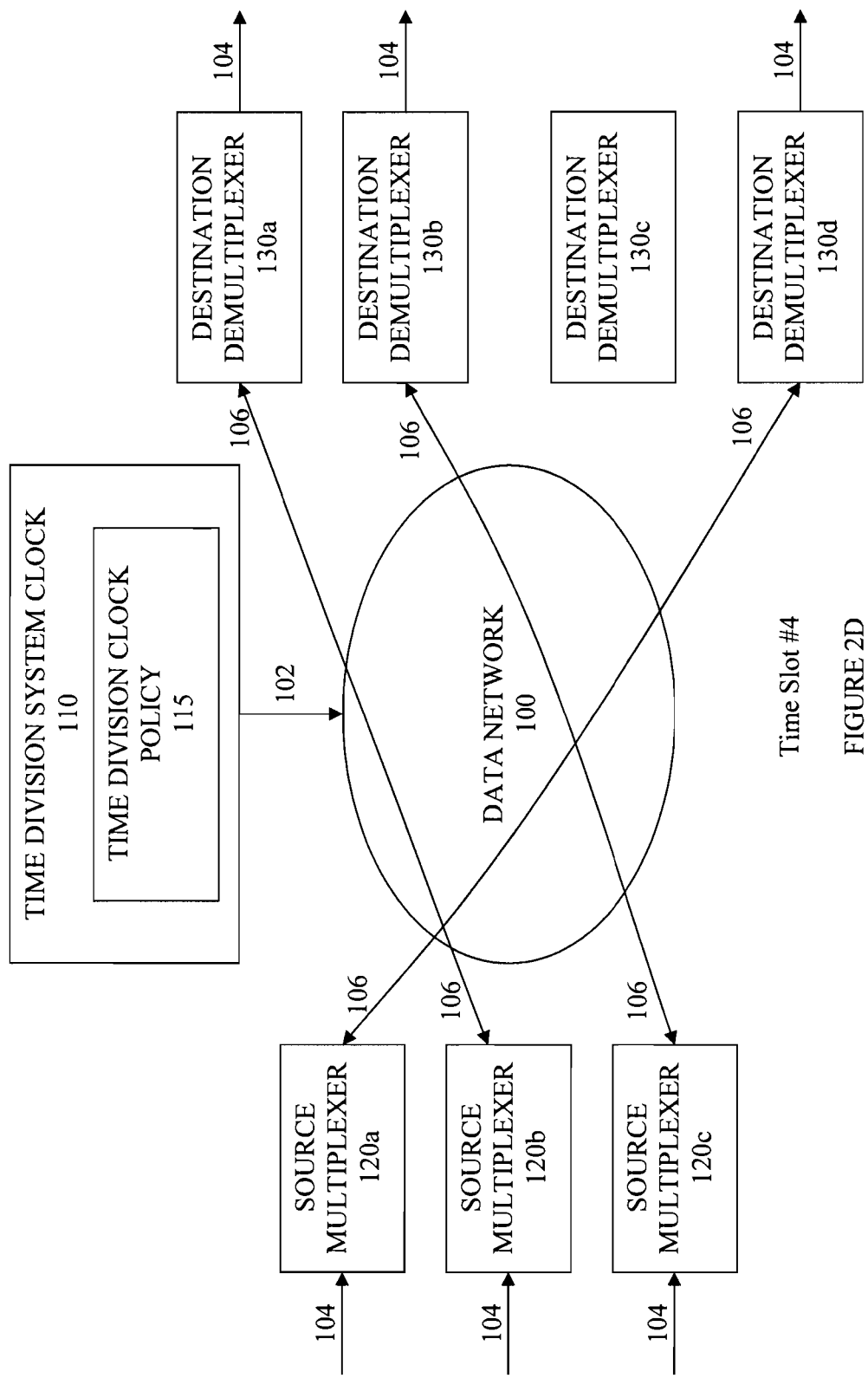

In FIG. 2D, time slot #4 of the time division clock policy 115 provides clock codes that permit the source multiplexer 120a to transmit data to the destination demultiplexer 130d, the source multiplexer 120b to transmit data to the destination demultiplexer 130a, and the source multiplexer 120c to transmit data to the destination demultiplexer 130b. During time slot #4, only clock codes from the time division system clock 110 via communication channel 102 are transmitted to destination demultiplexer 130c.

As described above, Tables 1-4 and FIGS. 2A-2D illustrate only one example of the time division clock policy 115. As each of the source multiplexers 120a-c and each of the destination demultiplexers 130a-d have access to the same time division clock policy 115, the time division system clock 110 can alter the duration of a time slot or repeat certain time slots over other time slots in order to change bandwidth allocation and quality of service of the channel 106 on the fly, depending on the needs of the network.

Also, in other embodiments, the time division clock policy 115 itself can vary depending on the needs of the network 100. Variations can be performed by any combination of varying the number or duration of time slots in the time division clock policy 115 available to a particular source multiplexer 120a-c or destination demultiplexer 130a-d and varying the number of transmissions to be sent or received by a particular source multiplexer 120a-c or destination demultiplexer 130a-d via the channel 106. Varying the number of transmissions to be sent or received by a particular source multiplexer 120a-c or destination demultiplexer 130a-d via the channel 106 is accomplished by assigning a disproportionate number of clock codes in the time division clock policy 115 to particular source multiplexers 120a-c, particular destination demultiplexers 130a-d, or both. Variations to the time division clock policy 115 allow the network 100 to provide more bandwidth and enhanced quality of service for a particular source multiplexer 120a-c to transmit data to the destination demultiplexers 130a-d or provide more bandwidth and enhanced quality of service for data to be transmitted to a particular destination demultiplexer 130a-d.

Figure 3:
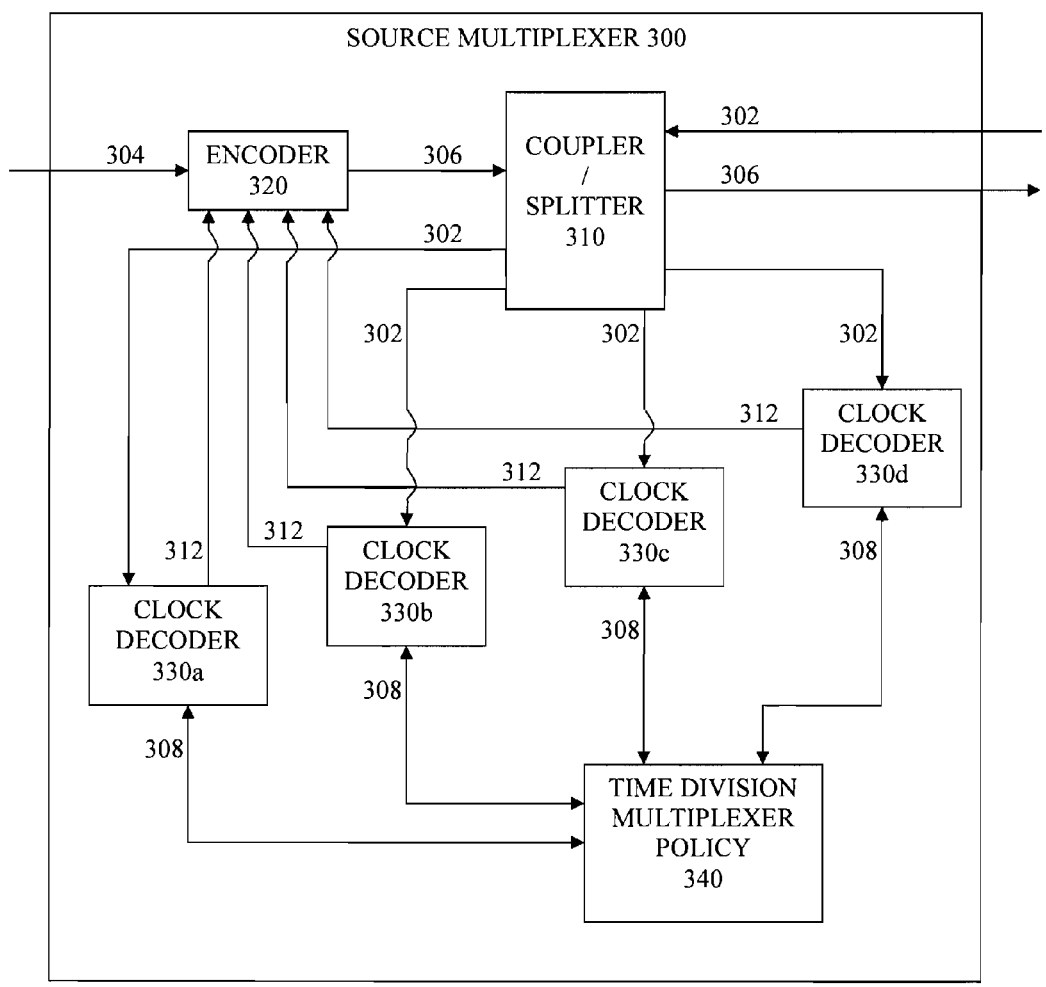
FIG. 3 is a block diagram of a source multiplexer provided in an optical data network according to one embodiment.

FIG. 3 provides a block diagram of one embodiment of an OCDMA code agile time division multiplexing source multiplexer 300, similar to the source multiplexers 120a-c in FIG. 1, that is capable of sharing one or more OCDMA channels in a time share fashion in order to avoid data collisions. The source multiplexer 300 includes a coupler/splitter 310 coupled to an encoder 320 and four OCDMA clock decoders 330a-d. The coupler/splitter 310 is configured to receive an OCDMA multiplexed bit stream 302 containing clock codes from an external time division system clock and transmit an OCDMA multiplexed bit stream 306 to an external destination demultiplexer. The encoder 320 is also coupled to the clock decoders 330a-d and is configured to receive and encode an un-encoded bit stream 304 from an external source based on an assigned OCDMA destination code 312. The clock decoders 330a-d have access to a time division multiplexer policy 340. The time division multiplex policy 340 is a translation table used by the clock decoders 330a-d to determine which external destination demultiplexer the source multiplexer 300 is assigned to interact with during a given time slot.

In operation, the coupler/splitter 310 receives an OCDMA multiplexed bit stream 302 from an external time division system clock and forwards the bit stream 302 to each of the clock decoders 330a-d. In the time division clock policy illustrated in Tables 1-4, for each time slot, one of the clock decoders 330a-d is capable of decoding one clock code 308 from the bit stream 302 and using the time division multiplex policy 340 to produce the assigned OCDMA destination code 312. The destination code 312 is sent from clock decoder 330a-d to the encoder 320, and used by the encoder 320 to encode an un-encoded bit stream 304 into an encoded bit stream 306. The encoded bit stream 306 is then sent to the coupler/splitter 310 and transmitted to the assigned external OCDMA destination demultiplexer.

Figure 4:
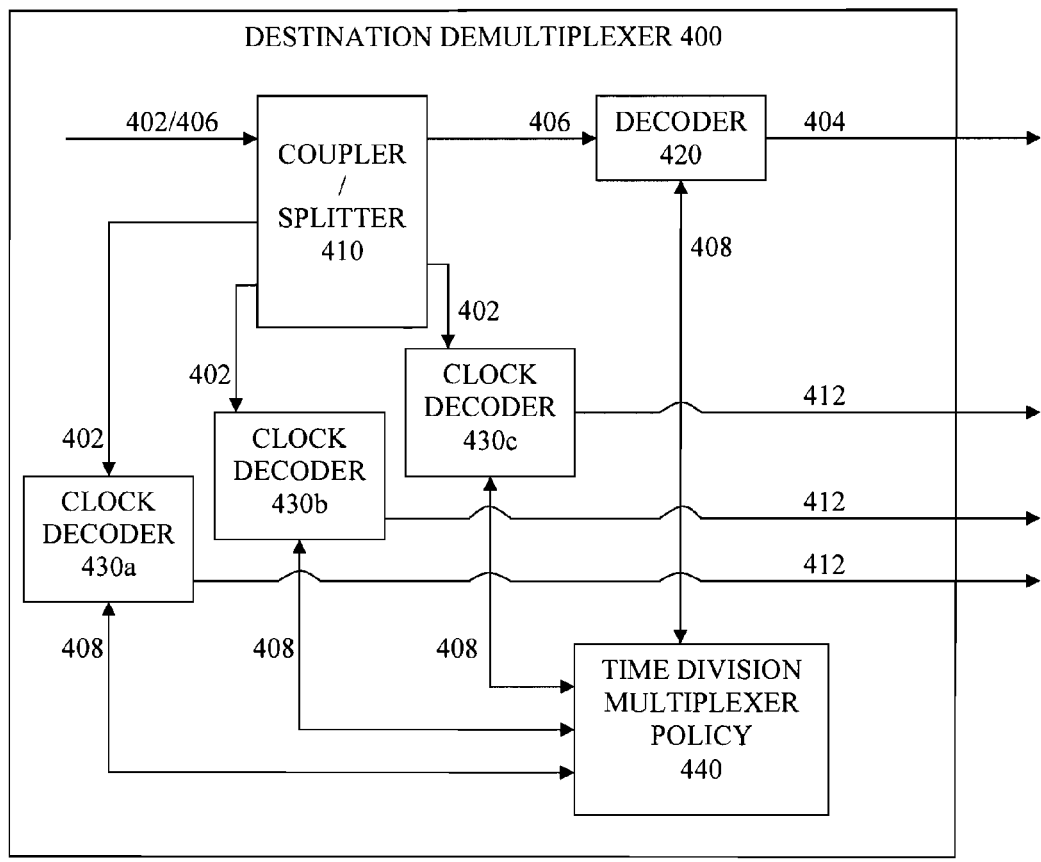
FIG. 4 is a block diagram of a destination de-multiplexer provided in an optical data network according to one embodiment.

FIG. 4 provides a block diagram of one embodiment of an OCDMA code agile time division multiplexing destination demultiplexer 400, similar to the destination demultiplexers 130a-d in FIG. 1, that is capable of demultiplexing data transmitted from an external assigned code agile time division multiplexing source multiplexer. The destination demultiplexer 400 includes a coupler/splitter 410 coupled to an OCDMA code agile time division multiplexing decoder 420 and three OCDMA clock decoders 430a-c. The coupler/splitter 410 is configured to receive an OCDMA multiplexed bit stream 402 from an external time division system clock and an OCDMA multiplexed bit stream 406 from an external OCDMA code agile time division multiplexing source multiplexer. The decoder 420 is also coupled to the clock decoders 430a-c and is configured to receive and decode an encoded bit stream 406 to an external source (not shown). The clock decoders 430a-c have access to a time division demultiplexer policy 440 and are configured to transmit an OCDMA code agile time division multiplexing multiplexer identifier 412 to the external source. The time division demultiplexer policy 440 is a translation table used by the decoder 420 and the clock decoders 430a-d to identify which source multiplexer sent the data bit stream 406 during a given time slot.

In operation, the coupler/splitter 410 receives the OCDMA multiplexed bit stream 402 from an external time division system clock and forwards the bit stream 402 to each of the clock decoders 430a-c. In the time division clock policy illustrated in Tables 1-4, for each time slot, one of the clock decoders 430a-c is capable of decoding one clock code 408 from the bit stream 402 and using the time division demultiplexer policy 440 to produce the OCDMA code agile time division multiplexing multiplexer identifier 412. The multiplexer identifier 412 is sent from particular clock decoder 430a-c to the external source to identify which external source multiplexer sent the bit stream 406. The clock code 408 is also used to program the decoder 420 to decode the bit stream 406 into a decoded bit stream 404. The decoded bit stream 404 is then sent to the external source along with the multiplexer identifier 412. Thus, the OCDMA code agile time division multiplexing destination demultiplexer 400 is capable of decoding an incoming bit stream 406 and is capable of determining the source multiplexer transmitting the bit stream 406 without requiring the incoming bit stream 406 to include information indicating the source multiplexer.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A system for optimizing the efficiency of simultaneous data transfers throughout a data network, comprising:
a time division system clock comprising a network time division clock policy having a plurality of time slots, wherein the network time division clock policy identifies a unique clock code for each of the plurality of time slots;
a source node comprising a unique source node portion of the network time division clock policy; and
a destination node comprising a destination node portion of the network time division clock policy,
wherein the time division system clock continuously transmits the unique clock code identified for a particular time slot to the source node and the destination node during a time duration of the particular time slot,
wherein based on the clock code and the unique source node portion for the source node, the source node determines whether it is assigned to the destination node during the time duration of the particular time slot and if the source node is assigned the communication channel, the source node is capable of transmitting a collision-free data transmission to the destination node, and
wherein if the source node is assigned to the destination node, the destination node is capable of receiving the collision-free data transmission from the source node and identifying the source node based on the unique clock code and the node portion of the network time division clock policy.

2. The system of claim 1, wherein the data network is an optical code division multiple access data network, the source node is an optical code division multiple access source multiplexer, and the destination node is an optical code division multiple access destination demultiplexer.

3. The system of claim 1, wherein the time division system clock varies the time duration for each of the plurality of time slots.

4. The system of claim 1, further comprising a plurality of source nodes and a plurality of destination nodes, each of the plurality of source nodes comprising a unique source node portion of the network time division clock policy and each of the plurality of destination nodes comprising a unique destination node portion of the network time division clock policy.

5. The system of claim 4, wherein the network time division clock policy identifies a plurality of unique clock codes for each of the plurality of time slots,
and the time division system clock continuously and simultaneously transmits the plurality of unique clock codes identified for the particular time slot to the plurality of source nodes and the plurality of destination nodes during the time duration of the particular time slot.

6. The system of claim 5, wherein based on the plurality of clock codes and a unique source node portion for a particular source node, the particular source node determines whether it is assigned to a particular destination node of the plurality of destination nodes during the time duration of the particular time slot and if the particular source node is assigned to the particular destination node, the particular source node is capable of transmitting a collision-free data transmission to the particular destination node, and wherein the particular destination node is capable of receiving the collision-free data transmission from the particular source node and identifying the particular source node based on the unique clock code and the unique node portion of the network time division clock policy.

7. The system of claim 1, wherein the data network is wavelength-division multiplexing data network, the source node is a wavelength-division multiplexing source multiplexer, and the destination node is a wavelength-division multiplexing destination demultiplexer.

8. The system of claim 1, wherein the data network is a radio frequency data network.

9. The system of claim 1, further comprising a plurality of communication channels to transmit collision-free data from the source node to the destination node.

10. The system of claim 1, wherein the source node and destination node each comprise the network time division clock policy.

11. A method for optimizing the efficiency of simultaneous data transfers throughout a data network, comprising:

a network time division clock policy within a time division system clock identifying a unique clock code for a particular time slot of a plurality of time slots;

the time division system clock continuously transmitting the unique clock code associated with the particular time slot during a time duration of the particular time slot;

a source node receiving the unique clock code and determining whether the source node is assigned to a destination node based on the received unique clock code and a unique source node portion of the network time division clock policy included in the source node, and if the source node is assigned to the destination node is capable of transmitting a collision-free data transmission to the destination node; and the destination node receiving the unique clock code from the time division system clock and if the source node is assigned to the destination node, the destination node is capable of receiving a collision-free data transmission from the source node and identifying the source node sending the collision-free data transmission based on the unique clock code and a destination node portion of the network time division clock policy included in the destination node.

12. The method of claim 11, the time division system clock varying the time duration for each of the plurality of time slots.

13. The method of claim 11, the data network comprises a plurality of source nodes and a plurality of destination nodes, each of the plurality of source nodes comprising a unique source node portion of the network time division clock policy and each of the plurality of destination nodes comprising a unique destination node portion of the network time division clock policy.

14. The method of claim 13, the network time division clock policy identifying a plurality of unique clock codes for each of the plurality of time slots, and the time division system clock continuously and simultaneously transmitting the plurality of unique clock codes identified for the particular time slot to the plurality of source nodes and the plurality of destination nodes during the time duration of the particular time slot.

15. The method of claim 14, a particular source node of the plurality of source nodes determining whether it is assigned to a particular destination node of the plurality of destination nodes during the time duration of the particular time slot, and if the particular source node is assigned to the particular destination node, the particular source node transmitting a collision-free data transmission to the particular destination node, and the particular destination node receiving the collision-free data transmission from the particular source node and identifying the particular source node based on the unique clock code and the unique node portion of the network time division clock policy.

16. The method of claim 11, wherein the data network is wavelength-division multiplexing data network, the source node is a wavelength-division multiplexing source multiplexer, and the destination node is a wavelength-division multiplexing destination demultiplexer.

17. The method of claim 11, wherein the data network comprises a plurality of communication channels for transmitting collision-free data transmissions from the source node to the destination node.

18. The method of claim 11, wherein the source node and the destination node each comprise the network time division clock policy.

\* \* \* \* \*